(12) United States Patent
Beaurepaire et al.

(10) Patent No.: US 12,276,729 B2
(45) Date of Patent: Apr. 15, 2025

(54) METHOD, APPARATUS, AND SYSTEM FOR LOCATION SHARING USING A LiDAR-BASED LOCATION SIGNATURE

(71) Applicant: HERE Global B.V., Eindhoven (NL)

(72) Inventors: Jerome Beaurepaire, Berlin (DE); Lauri Aarne Johannes Wirola, Tampere (FI); Eckhart Köppen, Tampere (FI)

(73) Assignee: HERE Global B.V., Eindhoven (NL)

( * ) Notice: Subject to any disclaimer, the term of this patent is extended or adjusted under 35 U.S.C. 154(b) by 423 days.

(21) Appl. No.: 17/546,803

(22) Filed: Dec. 9, 2021

(65) Prior Publication Data

US 2023/0184944 A1    Jun. 15, 2023

(51) Int. Cl.
*G01S 17/48* (2006.01)
*G01S 7/481* (2006.01)
*G01S 17/86* (2020.01)

(52) U.S. Cl.
CPC ............ *G01S 17/48* (2013.01); *G01S 7/4813* (2013.01); *G01S 7/4817* (2013.01); *G01S 17/86* (2020.01)

(58) Field of Classification Search
CPC .......... G01S 17/48; G01S 17/89; G01S 17/42; G01S 17/86; G01S 7/003; G01S 7/4813; G01S 7/4808; G01S 7/4817
See application file for complete search history.

(56) References Cited

U.S. PATENT DOCUMENTS

| | | | |
|---|---|---|---|
| 9,792,521 B2 | 10/2017 | Modica et al. | |
| 2016/0129593 A1* | 5/2016 | Wolowelsky | B25J 9/0003 901/1 |
| 2016/0291593 A1* | 10/2016 | Hammond | G06F 18/24 |
| 2017/0180460 A1* | 6/2017 | High | H04L 67/10 |
| 2018/0120116 A1* | 5/2018 | Rombouts | G01S 17/89 |
| 2019/0101934 A1* | 4/2019 | Tuukkanen | G01C 21/3691 |
| 2019/0197497 A1* | 6/2019 | Abari | G05D 1/0088 |
| 2019/0320061 A1 | 10/2019 | Salandy-Defour et al. | |
| 2020/0064826 A1* | 2/2020 | Engle | G05D 1/249 |
| 2020/0090501 A1 | 3/2020 | Gilbertson et al. | |
| 2020/0160718 A1* | 5/2020 | Saleh | G08G 1/202 |
| 2020/0173796 A1* | 6/2020 | Beaurepaire | G01C 21/3415 |
| 2020/0173808 A1* | 6/2020 | Beaurepaire | G06Q 50/40 |
| 2020/0233096 A1 | 7/2020 | Hazlett | |
| 2020/0304952 A1 | 9/2020 | Berkovich et al. | |
| 2020/0410784 A1* | 12/2020 | Agrawal | G07C 5/008 |
| 2021/0239815 A1* | 8/2021 | Acosta | G01C 21/20 |

OTHER PUBLICATIONS

"Apple unveils new iPad Pro with breakthrough LiDAR Scanner and brings trackpad support to iPadOS", Apple Inc., Mar. 18, 2020, 10 pages.

* cited by examiner

*Primary Examiner* — Sang H Nguyen

(74) *Attorney, Agent, or Firm* — DITTHAVONG, STEINER, & MLOTKOWSKI

(57) ABSTRACT

An approach is provided for location sharing using a LiDAR-based location signature. The approach involves, for example, receiving a Light Detection and Ranging (LiDAR) scan of a location captured by a LiDAR sensor of a portable device. The approach also involves processing the LiDAR scan to generate a LiDAR location signature that is representative of the location of the portable device. The approach further involves transmitting the LiDAR location signature to another device to share the location of the portable device with the another device.

20 Claims, 14 Drawing Sheets

METHOD, APPARATUS, AND SYSTEM FOR LOCATION SHARING USING A LiDAR-BASED LOCATION SIGNATURE

BACKGROUND

Traditionally, location sharing between portable devices (e.g., mobile phones, wearable devices, etc.) is based on satellite-based positioning technology (e.g., Global Navigation Satellite System (GNSS) based technology). However, GNSS technology can be susceptible to multi-path signal interference (e.g., from urban canyons, or other challenging environmental conditions) and/or potentially compromise privacy (e.g., by potentially exposing precise a user's precise location coordinate data). Accordingly, service providers face significant technical challenges to developing alternative location-sharing technologies, e.g., when traditional technologies such as GNSS are not available or otherwise not suitable for a given application.

Some Example Embodiments

Therefore, there is a need for an approach for location sharing using depth-sensing technologies such as Light Detection and Ranging (LiDAR) sensors which are becoming increasingly common on portable devices (e.g., mobile phones, augmented reality glasses, etc.).

According to one embodiment, a method comprises receiving, by one or more processors, a Light Detection and Ranging (LiDAR) scan (or other equivalent depth-sensing scan) of a location captured by a LiDAR sensor of a portable device. The method also comprises processing the LiDAR scan to generate a LiDAR location signature that is representative of the location of the portable device. The method further comprises transmitting the LiDAR location signature to another device to share the location of the portable device with the another device.

According to another embodiment, an apparatus comprises at least one processor, and at least one memory including computer program code for one or more computer programs, the at least one memory and the computer program code configured to, with the at least one processor, cause, at least in part, the apparatus to receive a Light Detection and Ranging (LiDAR) scan (or other equivalent depth-sensing scan) of a location captured by a LiDAR sensor of a portable device. The apparatus is also caused to process the LiDAR scan to generate a LiDAR location signature that is representative of the location of the portable device. The apparatus is further caused to transmit the LiDAR location signature to another device to share the location of the portable device with the another device.

According to another embodiment, a computer-readable storage medium carries one or more sequences of one or more instructions which, when executed by one or more processors, cause, at least in part, an apparatus to receive a Light Detection and Ranging (LiDAR) scan (or other equivalent depth-sensing scan) of a location captured by a LiDAR sensor of a portable device. The apparatus is also caused to process the LiDAR scan to generate a LiDAR location signature that is representative of the location of the portable device. The apparatus is further caused to transmit the LiDAR location signature to another device to share the location of the portable device with the another device.

According to another embodiment, a computer program product may be provided. For example, a computer program product comprising instructions which, when the program is executed by a computer, cause the computer to receive a Light Detection and Ranging (LiDAR) scan (or other equivalent depth-sensing scan) of a location captured by a LiDAR sensor of a portable device. The computer is also caused to process the LiDAR scan to generate a LiDAR location signature that is representative of the location of the portable device. The computer is further caused to transmit the LiDAR location signature to another device to share the location of the portable device with the another device.

According to another embodiment, an apparatus comprises means for receiving, by one or more processors, a Light Detection and Ranging (LiDAR) scan (or other equivalent depth-sensing scan) of a location captured by a LiDAR sensor of a portable device. The apparatus also comprises means for processing the LiDAR scan to generate a LiDAR location signature that is representative of the location of the portable device. The apparatus further comprises means for transmitting the LiDAR location signature to another device to share the location of the portable device with the another device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the portable device side or in any shared way between service provider and portable device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for location sharing based on a Light Detection and Ranging (LiDAR) location signature are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
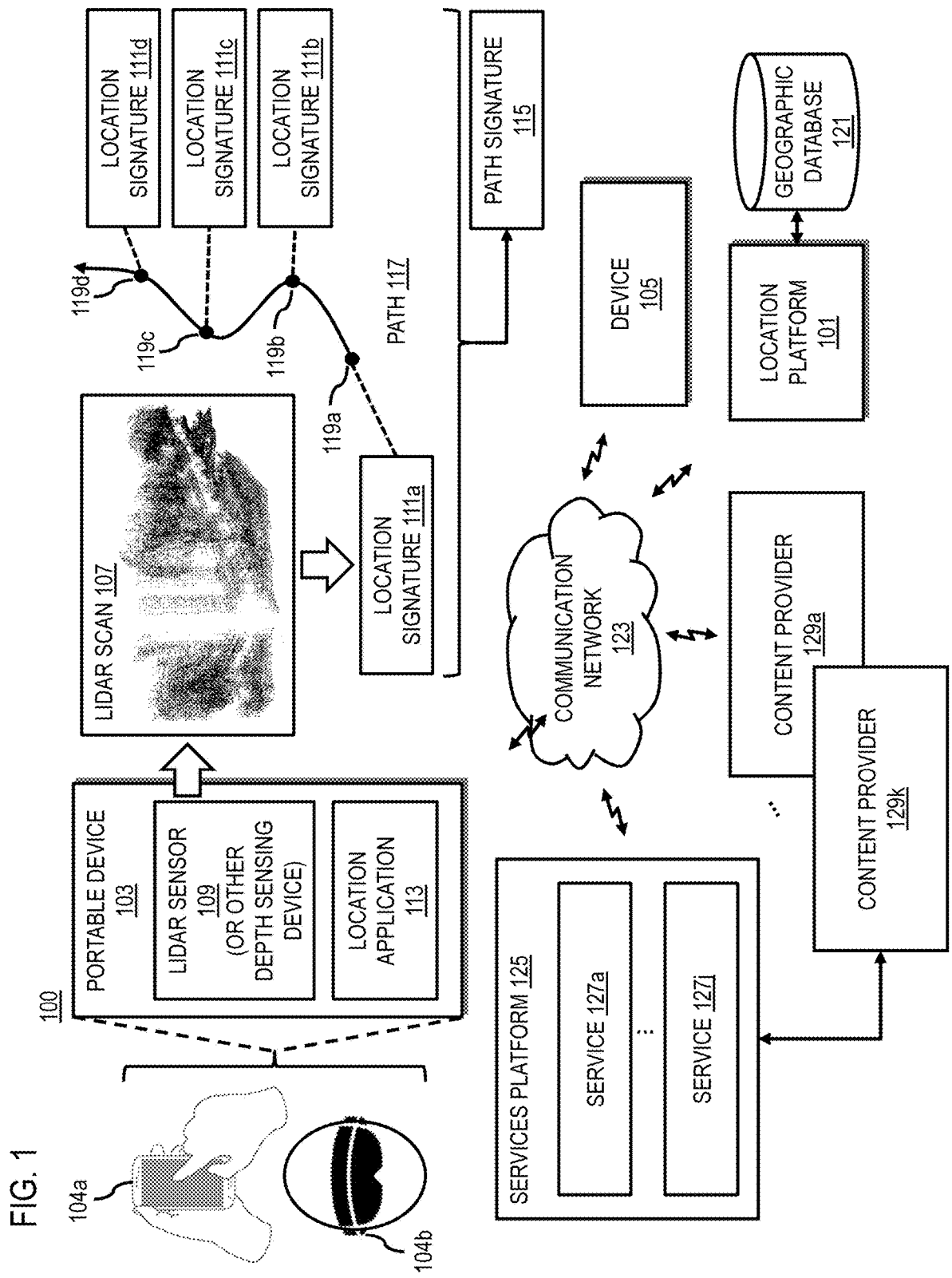
FIG. 1 is a diagram of a system for location sharing using a Light Detection and Ranging (LiDAR)-based location signature, according to various example embodiments.

FIG. 1 is a diagram of a system for location sharing using a Light Detection and Ranging (LiDAR)-based location signature, according to various example embodiments. As discussed above, one area of development for mapping and navigation services providers (e.g., provider of a location platform 101) is in the area of location-sharing between portable devices 103 (e.g., a mobile phone 104a, augmented-reality device 104b, wearable device (not shown), head-mounted device (not shown), tablet (not shown), portable computer (not shown), etc.) and other devices 105 (e.g., other portable devices 103 and/or any other device capable of sharing locations). As used herein, a "portable device" refers to any device that a user can hold, wear, carry, or otherwise be attached to. In particular, technical challenges involve overcoming the limitations of existing location-sharing technologies such as those based on Global Navigation Satellite Systems (GNSS) or equivalent. GNSS receivers are susceptible to multi-path interference and generally need a line of sight to orbiting navigation satellites to determining positioning data with a specified level of accuracy. This limits the accuracy or possibility of location sharing in certain environments (e.g., indoor environments, urban canyons, tunnels, etc.) where positioning data may not possible. Other traditional methods of location sharing (e.g., sharing an image captured by a camera on the device) can potentially raise privacy concerns by depicting privacy sensitive information (e.g., faces, interior spaces, license plates, and/or any other personally identifiable features).

To address these technical challenges, a system 100 of FIG. 1 introduces a capability for using LiDAR scans (e.g., LiDAR scan 107) on a device (e.g., a portable device 103 such as but not limited to a mobile phone including a LiDAR sensor 109) to generate LiDAR-based location signatures (e.g., LiDAR location signatures 111a-111d—also collectively referred to as LiDAR location signatures 111, depth-sensing location signatures 111, and/or location signatures 111). It is noted that although the various embodiments described herein are discussed with respect to using a LiDAR sensor 109 of a portable device 103 to generate LiDAR scans, it is contemplated that any other type of depth sensing sensor (e.g., any other time-of-flight sensor capable of generating a point cloud representation of an environment) can be used equivalently in the embodiments described herein. By way of example, a LiDAR sensor 109 scans an environment by transmitting laser pulses to various points in the environment and records the time delay of the corresponding reflected laser pulse as received at the LiDAR sensor 109. The distance from the LiDAR sensor 109 to a particular point in the environment can be calculated based on the time delay. When the distance is combined with an elevation of the laser pulse as emitted from the LiDAR sensor 109, a three-dimensional (3D) coordinate point can be computed to represent the point on a surface in the environment to which the laser pulse was directed. By scanning multiple points in the environment, the LiDAR sensor 109 can generate a three-dimensional (3D) point cloud representation of the environment (e.g., LiDAR scan 107). In one embodiment, the LiDAR sensor 109 sensor can be a hyperspectral sensor that scans the environment with laser pulses at different wavelengths to determine additional surface characteristics (e.g., surface material, etc.). For example differences in the time delay at different wavelengths can be indicative of differences in surface characteristics, and thus can be used to identify a surface characteristic. These additional characteristics can also be included in the LiDAR-based location signature 111.

In one embodiment, the LiDAR-based location signature 111 can be computed from the LiDAR scan 107 (e.g., by extracting features from the 3D point cloud, subsampling the 3D point cloud, cropping the 3D point cloud, etc.). Such LiDAR location signatures 111 can provide information about where the device is located, information about object(s) found at the location, and/or information about other characteristics/attributes associated with the location, among other possibilities. In one embodiment, the portable device 103 (e.g., via a location application 113) can share the LiDAR-based location signature 111 with another device 105 (i.e., effect location sharing) or otherwise store the LiDAR-based location signature 111 for later reference or use. In either case, the portable device 103 at issue (or another device 105 that obtained the LiDAR-based location signature 111) could use the LiDAR-based location signature 111 to navigate to the location, identify or find the location, avoid the location, or identify changes to attributes/characteristics/objects in the location, depending on the context and/or use case of the LiDAR-based location signature 111.

In one embodiment, the system 100 can also generate a LiDAR "path" signature 115 (also referred to as a depth-sensing path signature 115 and/or path signature 115) that enables a portable device 103 to collect a continuous LiDAR scan along a path 117 or collect respective LiDAR scan(s) from time-to-time along the path (e.g., a respective points 119a-119d of the path 117), to generate a LiDAR path signature 115 representative of the portable device 103's path 117 in the environment. By way of example, corresponding location signatures 111a-111d can be generated for each LiDAR scan of the points 119a-119d. Then the location signatures 111 of the points 119a-119d can be combined or otherwise processed to generate the LiDAR path signature 115. In addition or alternatively, the LiDAR path signature 115 can be generated directly from the LiDAR scans of the points 119a-119d without first computing individual LiDAR location signatures 111a-111d (e.g., by extracting features, subsampling, etc. the combined points clouds of the LiDAR scans of the path 117).

In one embodiment, the portable device 103 can be a dead mounted device or any other wearable device that is equipped with a LiDAR sensor 109 or equivalent depth sensing sensor. In this use case, such head-mounted or wearable portable devices 103 can make the capturing of a LiDAR scan 107 more intuitive and convenient, without having to lift a device to point in a direction to capture salient features of the environment.

In one embodiment, LiDAR scans 107 and/or corresponding LiDAR location signatures 111 or LiDAR path signatures 115 can be stored on the cloud (e.g., in the geographic database 121 or equivalent data store of the location platform 101) over a communication network 123. In addition or alternatively, a services platform 125, one or more services 127a-127j (also collectively referred to as services 127), and/or one or more content providers 129a-129k (also collectively referred to as content providers 129) can provide cloud storage for the LiDAR scans 107, LiDAR location signatures 111, and/or LiDAR path signatures 115, and/or provide services or applications based on the LiDAR scans 107, LiDAR location signatures 111, and/or LiDAR path signatures 115 across a range of use cases discussed further below.

In one embodiment, the system 100 can leverage edge capabilities for live matching of LiDAR location signatures 111 and/or LiDAR path signatures 115 locally at an edge device against with reference scans or signatures (e.g., stored at the edge device or retrieved from a cloud device).

The various embodiments described herein provide for several technical advantages including but not limited to:

Privacy sensitive/compliant location sharing as no personal information is captured (e.g., capturing 3D points of a point cloud representation or features extracted therefrom), in comparison, for instance, with a scene picture sharing (e.g., where visual characteristics are captured in more detail and can expose personally identifiable information);

More efficient in low-light conditions, compared to use of images (e.g., visual localization);

Acquisition speed/requirements (e.g., scan quality less susceptible to various movement(s) compared to use of images);

Depth sensing could help recognize a location from multiple angles because of 3D point capture, and is therefore, more robust that the two-dimensional capture of traditional images; and Compared to LiDAR on cars, LiDAR on portable devices 103 (e.g., mobile or wearable devices) can be placed in numerous locations and orientations in the environment (e.g., indoor environments) that are not accessible from a car.

In one embodiment, the portable device 103 executes or otherwise includes a location application 113 for generating LiDAR location signatures 111 and/or LiDAR path signatures 115 according to the various embodiments described herein. In addition or alternatively, the location platform 101 (e.g., cloud component) can perform one or more functions associated with generating LiDAR location signatures and/or LiDAR path signatures 115 alone or in combination with the location application 113.

Figure 2:
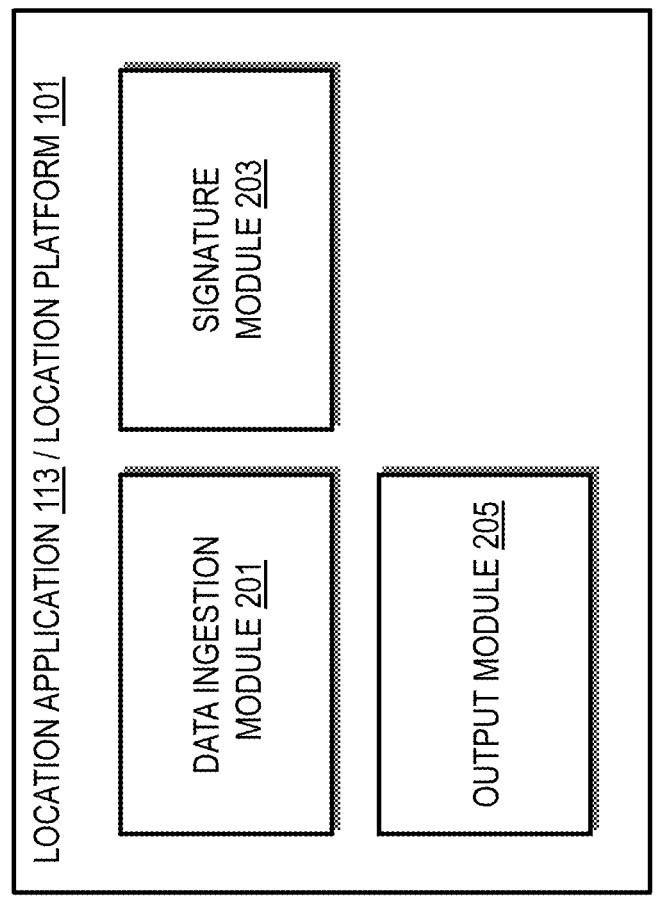
FIG. 2 is a diagram of the components of a location application and/or location platform capable of location sharing using LiDAR-based location signature and/or LiDAR path signature, according to various example embodiments.

FIG. 2 is a diagram of the components of the location application 113 and/or location platform 101 capable of location sharing using LiDAR-based location signature 111 and/or LiDAR path signature 115, according to various example embodiments. The location application 113 and/or location platform 101 include one or more components for generating LiDAR location signatures 111 and/or LiDAR path signatures, according to the various embodiments described herein. It is contemplated that the functions of these components may be combined or performed by other components of equivalent functionality. As shown, in one embodiment, the location application 113 and/or location platform 101 includes a data ingestion module 201, a signature module 203, and an output module 205. The above presented modules and components of the location application 113 and/or location platform 101 can be implemented in hardware, firmware, software, or a combination thereof. Though depicted as a separate entities in FIG. 1, it is contemplated that the location application 113 and/or location platform 101 may be implemented as a module of any of the components of the system 100 (e.g., a component of the services platform 125, services 127, content providers 129, and/or the like). In another embodiment, one or more of the modules 201-205 may be implemented as a cloud-based service, local service, native application, or combination thereof. The functions of the location application 113, location platform 101, and modules 201-205 are discussed with respect to the figures described below.

Figure 3:
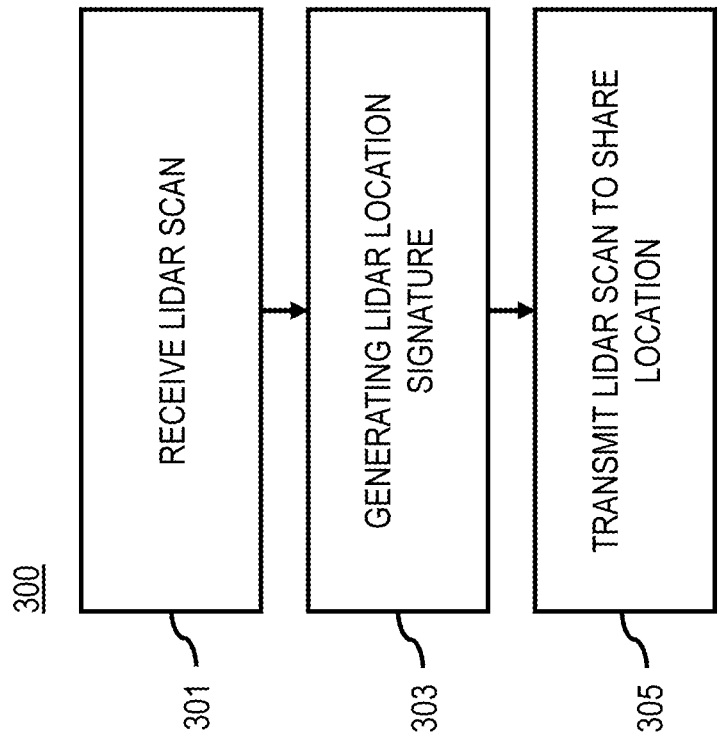
FIG. 3 is a flowchart of a process for location sharing using a LiDAR-based location signature, according to various example embodiments.
Figure 13:
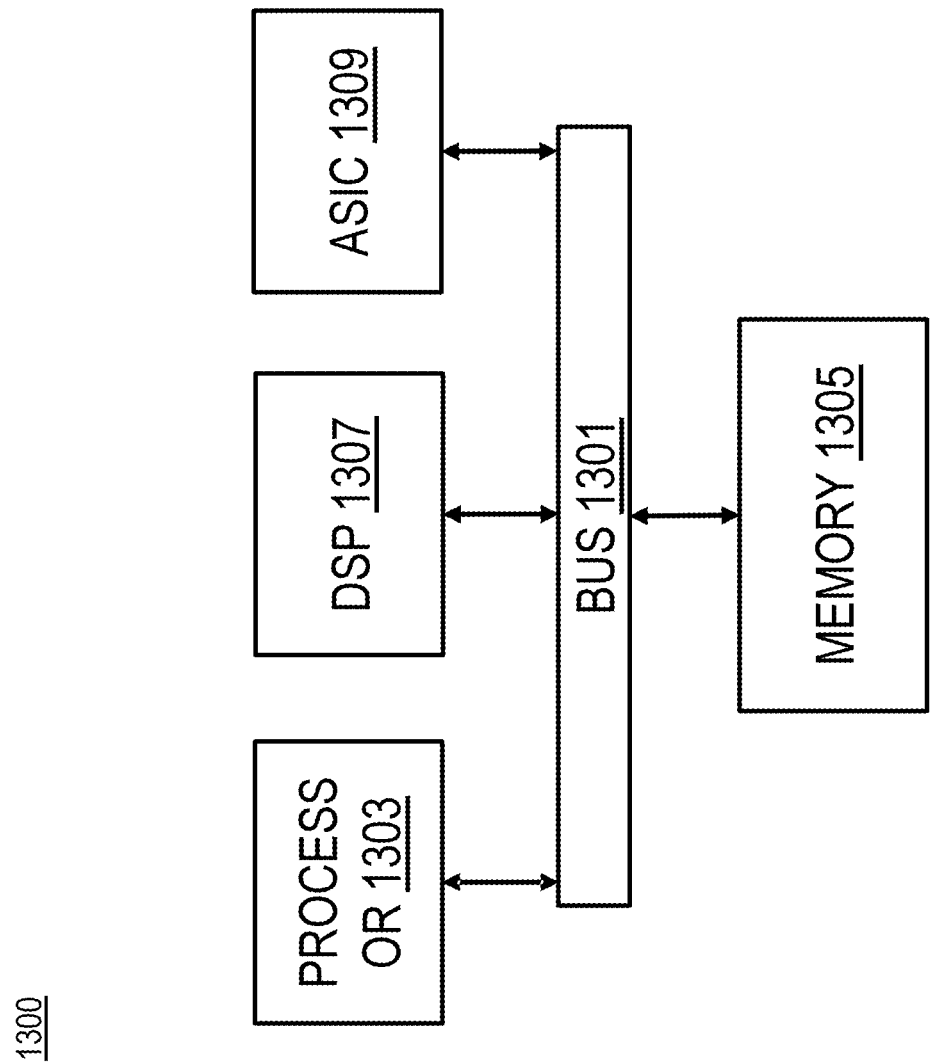
FIG. 13 is a diagram of a chip set that can be used to implement various example embodiments.

FIG. 3 is a flowchart of a process for location sharing using a LiDAR-based location signature, according to various example embodiments. In various embodiments, the location application 113, location platform 101, and modules 201-205 may perform one or more portions of the process 300 and may be implemented in, for instance, a chip set including a processor and a memory as shown in FIG. 13. As such, the location application 113, location platform 101, and modules 201-205 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the data ingestion module 201 receives a Light Detection and Ranging (LiDAR) scan of a location captured by a LiDAR sensor of a portable device 103. The location, for instance, can be any location that a user of the portable device 103 wants to share. When the user reaches the location to share, the user activates the location application 113 of the portable device 103 to capture a LiDAR scan 107 using the LiDAR sensor 109. As noted above, although the embodiments described herein are discussed with respect to a LiDAR sensor 109, it is contemplated that any equivalent depth sensing sensor (e.g., any time-of-flight sensor including but not limited to a radar sensor) can be used. When used with other depth sensing sensors, the scan can be referred to herein as a depth sensing scan and the resulting location signature can be referred to as a depth sensing location signature.

In one embodiment, e.g., to provide for a more consistent scanning experience, the data ingestion module 201 generates a user interface that presents a scanning parameter for initiating the capturing of the LiDAR scan 107. By way of example, the scanning parameter includes, but is not limited to, a scanning duration, a scanning direction, a scanning orientation, or a combination thereof. The data ingestion module 201 then presents the user interface on the portable device 103 to direct a user of the portable device 103 on how to scan the environment. For example, the guidance could help improve the data collection experience, data quality, or outcome of using the signature(s) for a given use case etc.

Figure 4B:
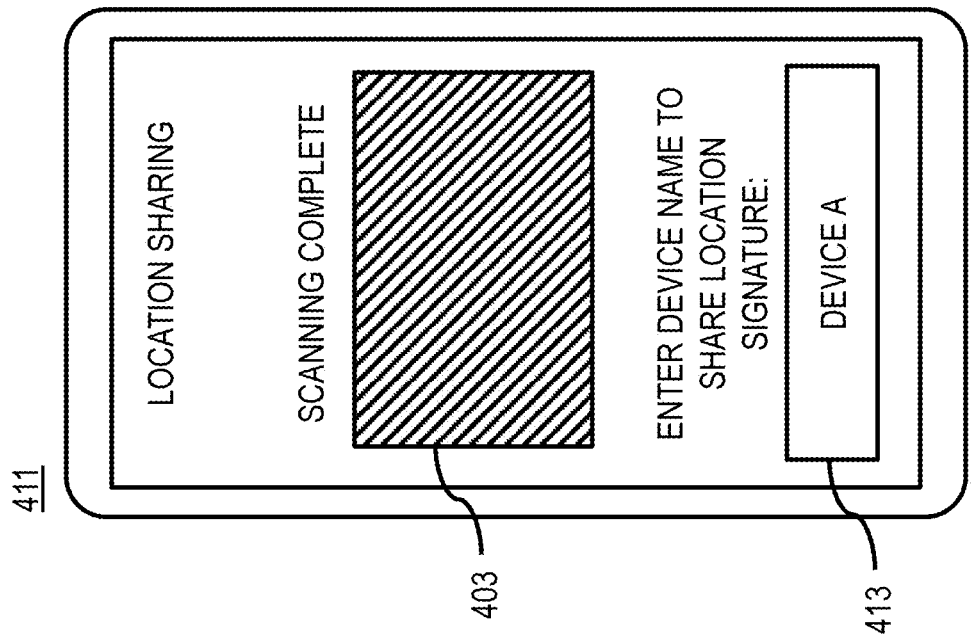
FIGS. 4A and 4B are diagrams illustrating example user interfaces for creating and sharing a LiDAR-based location signature, according to various example embodiments.
Figure 4A:
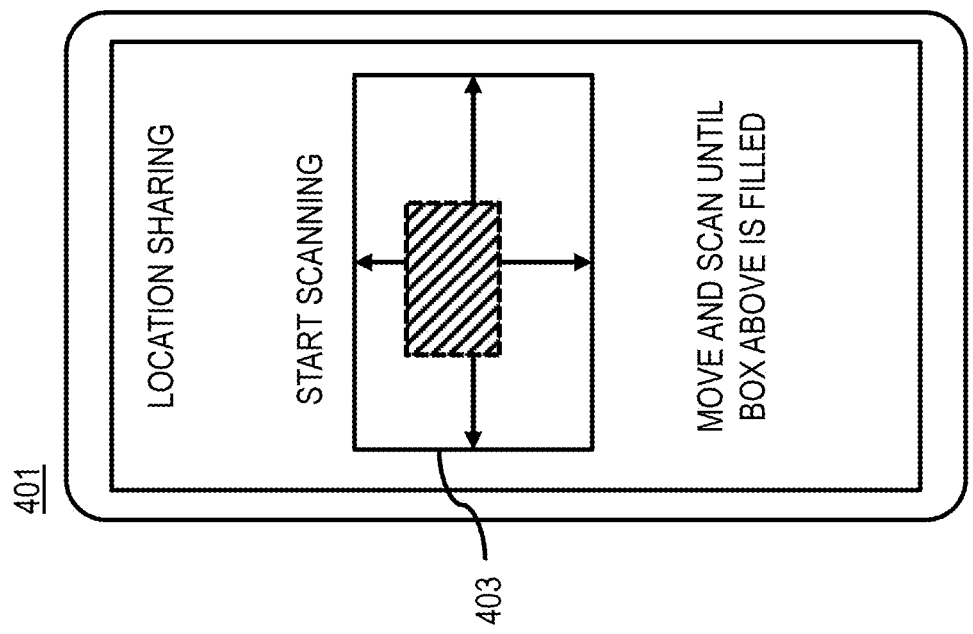

FIGS. 4A and 4B are diagrams illustrating example user interfaces (UIs) for creating and sharing a LiDAR-based location signature, according to various example embodiments. Example UI 401 of FIG. 4A presents a UI element 403 that indicates the orientation and directions to capture a LiDAR scan 107 for generating a LiDAR-based location signature 111. In this example, the scanning directions to cover are represented by respective arrows in the UI element 403 and a shaded area in the UI element 403 indicating the area of the environment that has already been scanned. The UI 401 instructs the user to start scanning and moving the portable device 103 while scanning to completely fill shade UI element 403. When the user has scanned the specified area corresponding to the UE element 403 (e.g., indicated by a completely shaded UI element 403 in UI 411 of FIG. 4B), a messaging indicating "scanning complete" can be displayed in the UI 411. Scanning, for instance, refers to moving the portable device 103 in different point directions and/or orientations so that the emitted laser pulses of LiDAR sensor 109 covers the area of interest to generate a LiDAR scan 107. Depending on the specification of the LiDAR sensor 109 and the distance to the surfaces being scanned, a typical LiDAR scan 109 can have varying resolutions (e.g., point spacing of less approximately 0.5 meters) and accuracy (e.g., 1-20 mm accuracy). LiDAR resolution is generally much less than traditional camera image resolution. The benefit of this decreased resolution (relative to traditional camera images) is that this preserves privacy (e.g., by obscuring any personally identifiable features) while still preserving geometric features that can uniquely represent a geographic environment (e.g., relative positions of surfaces and/or objects in the environment).

In step 303, the signature module 203 processes the LiDAR scan 107 to generate a LiDAR-based location signature 111 that is representative of the location of the portable device 103. The LiDAR scan 107, for instance, can be a point cloud of 3D coordinates representing the surfaces in the environment that has reflected the laser pulses of the LiDAR sensor. Accordingly, in one embodiment, the LiDAR-based location signature 111 can simply include a point cloud representing all or at least a portion of the environment of the location included in the LiDAR scan 107. To save storage space and reduce computer resources for processing larger location signatures, the signature module 203 can crop the LiDAR scan 107 to depict a smaller area in the LiDAR-based location signature 111. In addition or alternatively, the processing of the LiDAR scan 107 can comprise of extraction one or more features (e.g., walls, edges, corners, feature intersections, etc.) and including just the extracted features in the LiDAR-based location signature 111.

In one embodiment, the data ingestion module 201 may have also initiated capturing additional sensor data representing an attribute of an environment of the location. For example, the additional sensor data may include or be based hyperspectral data collected by the LiDAR sensor 109. Hyperspectral data, for instance, includes time delay of reflected laser pulses determined across different wavelengths of light. The differences in the time delays among the different wavelengths for a given point or surface can be indicative of an attribute (e.g., type of material) of the surface in the environment. The signature module 203 processes the hyperspectral data to determine information about a material of an object and/or surface located in the environment of the location. The signature module 203 then associates the additional sensor data, information determined from the additional sensor data, or a combination thereof with the LiDAR-based location signature 111.

In one embodiment, the signature module 203 could enable manual or automatic "tagging" of a LiDAR signature 115 with supplementary information, e.g., indicating what the signature represents, the reason it is being sent, and/or a request for an action.

In step 305, the output module 205 transmits the LiDAR-based location signature 111 to another device 105 to share the location of the portable device 103 with the other device 105. In other words, instead of sharing traditional GPS coordinates, camera images, etc., the portable device 103 shares the LiDAR-based location signature 111 to share its location with another device 105.

For example, user A's device (e.g., a portable device 103) completes a LiDAR scan 107 to generate a LiDAR-based location signature 111 (e.g., scan a specific portion of the user's environment for the purpose of specifying a particular meeting location to user B). User A's location is shared with user B's device (e.g., device 105 or another portable device 103) based on the LiDAR-based location signature 111 generated by user A's device.

On receiving, the shared LiDAR-based location signature 111, user B's device has at least two options including but not limited to:

Option 1: Compare LiDAR signature to reference LiDAR data/fingerprints, e.g., in cloud, edge device, or user B's device (e.g., pre-captured via crowdsourcing). In this way, the location can be obtained or determined by user B's device.

Option 2: User B's uses his/her device to complete subsequent LiDAR scan(s) of an environment in a given area until a substantial match is found with respect to user A's generated LiDAR-based location signature 111. In other words, user A's generated LiDAR-based location signature 111 serves as reference LiDAR data/fingerprint(s), which may be compared to user B's subsequent LiDAR scan(s).

In either case, in one embodiment, a coarse location of user A may be known. This may enable filtering out of reference LiDAR data in Option 1 and/or provide a scanning area in Option 2, among others.

More specifically, with respect to Option 1, in one embodiment, the other device 105 (e.g., user B's device or any other device receiving the shared LiDAR-based location signature 111) can compare the shared LiDAR location signature 105 to a reference LiDAR location signature to determine the shared location of the portable device 103 from which the LiDAR location signature was received. By way of example, the reference LiDAR location signature can be generated by crowdsourcing, a cloud device, an edge device, the device 105 receiving the shared LiDAR-based location signature 111, or a combination thereof. For example, with respect to crowdsourcing, multiple devices 105 can generate LiDAR-based location signatures 111 when visiting various locations and store them in a data store (e.g., the geographic database 121 or equivalent) along with a corresponding location. These reference LiDAR-based location signatures 111 and corresponding locations can be created and/or stored locally at the portable devices 103, devices 105, or any other edge device. In addition or alternately, the reference LiDAR location signatures can be created and/or stored by cloud components such as, but not limited to, the location platform 101, services platform 125, services 127, and/or content providers 129.

In one embodiment, the reference LiDAR location signatures can be generated procedurally from digital map data (e.g., map data of the geographic database 121). For example, if the map includes, 3D modeling data of buildings or other features at a given location. The 3D modeling data can be converted to a 3D point cloud representation from which the corresponding reference location signature can be created without having to actually scan the location using a LiDAR sensor or equivalent depth sensing sensor.

Figure 5B:
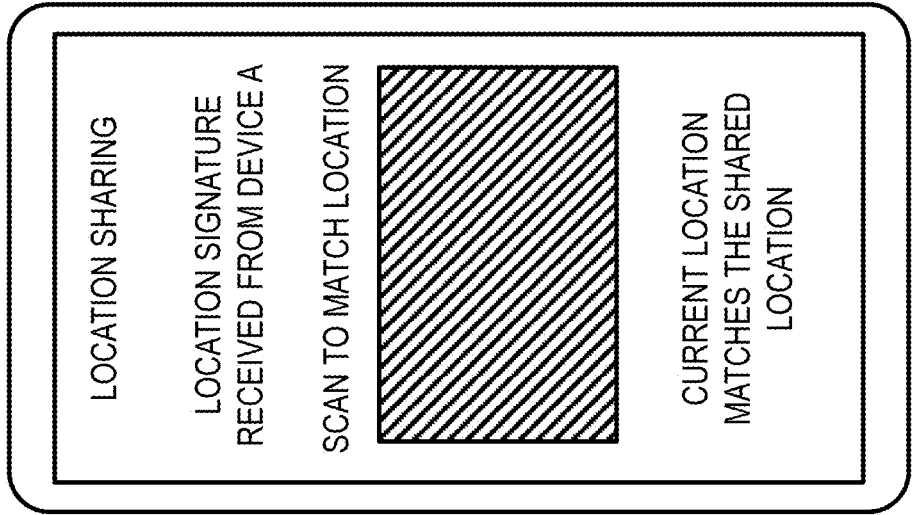
FIGS. 5A-5C are diagrams illustrating example user interfaces for using a shared LiDAR-based location signature, according to various example embodiments.
Figure 5A:
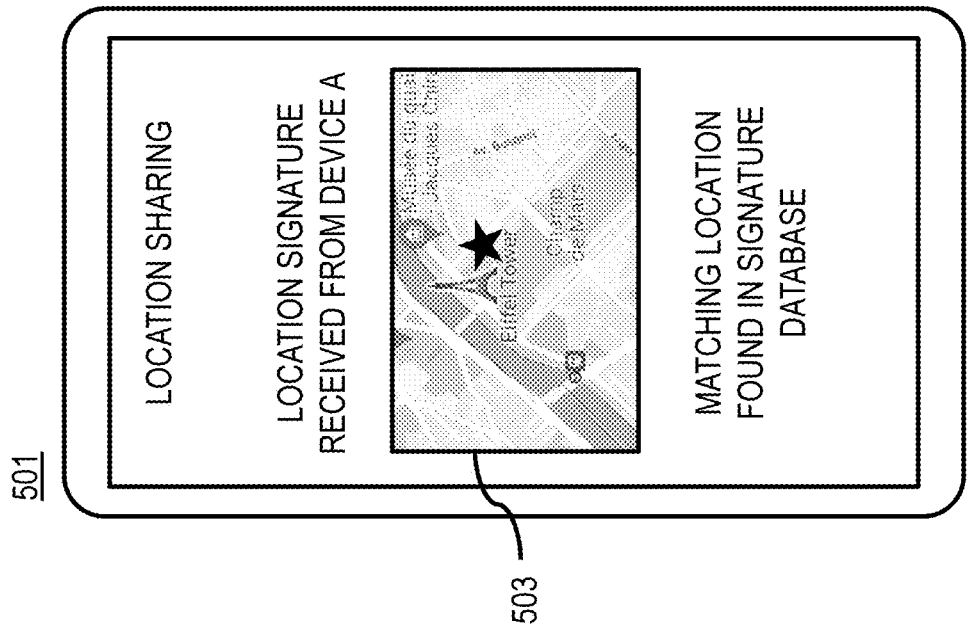

FIG. 5A illustrates an example UI 501 depicting a location sharing application that has received a LIDAR-based location signature 111 from another device (e.g., "Device A" belonging to user A). The receiving device (e.g., device 105 or another portable device 103) queries a database of reference location signatures for match. For example, if the signatures are 3D point clouds (or portions thereof), the received LiDAR-based location signature 111 can be compared to candidate location signatures in a reference database. Then, the reference location signature with the highest number of matching points in the 3D point cloud and/or with the number of matching points greater than a than a threshold value can be returned as a match. The location corresponding to the matching reference location signature can then be returned as the matched location. In the example of FIG. 5A, a matching location (e.g., location at the Eiffel Tower in Paris, France) was found for the received LiDAR-based location signature 111 received from user A, and then presented in UI element 503.

With respect to Option 2, in one embodiment, the receiving device associated with user B (e.g., device 105 or another portable device 103) uses the received LiDAR-based location signature 111 as a reference location signature to determine when user B is in a location that matches the location corresponding to user A's LiDAR location signature. For example, user B captures a subsequent LiDAR scan 107 of an environment in a given area until a subsequent LiDAR location signature generated from the subsequent LiDAR scan matches the LiDAR-based location signature 111 of the sharing portable device 103 within a threshold matching criterion (e.g., threshold of matching points in a 3D point cloud, threshold number of matching extracted features, etc.).

Similar to FIG. 5A, FIG. 5B illustrates an example UI 511 depicting a location sharing application that has received a LiDAR-based location signature 111 from another device (e.g., "Device A" belonging to user A). Instead of matching the received LiDAR-based location signature 111 to a reference location signature as in Option 1, the receiving device (e.g., device 105 or another portable device 103) attempts to move to a location corresponding to the received LiDAR-based location signature 111. To determine whether it has reached the correct location, the receiving device captures a LiDAR scan at its current location and generates a corresponding LiDAR location signature for the current location. UI 511, for instance, can provide guidance to "Scan to match location" (e.g., with scanning parameters a described with respect to FIG. 4A) for user B to capture the LiDAR scan. The subsequently generated LiDAR location signature is compared to the receive LiDAR-based location signature 111 from user A. If there is a match (e.g., above a threshold matching criterion), then the UI 511 alerts user B by presenting a message that the "Current location matches shared the shared location."

In one embodiment, the LiDAR location signature can be used for various use cases including, but not limited to, indicating a meeting location, a delivery location, a parking location, a location that is to be avoided, or a combination thereof.

Figure 5C:
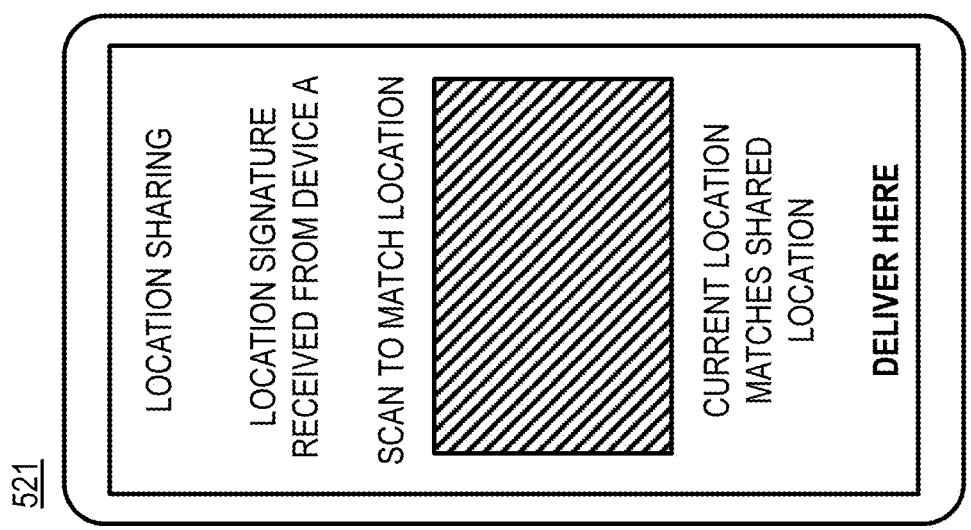

For example, FIG. 5C illustrates an example UI 521 that is similar to the example UI 511 of FIG. 5B for use in a delivery context. In this context, the LiDAR-based location signature 111 shared by user A indicates a desired delivery location specified by user A. As with the example of FIG. 5B, the receiving device (e.g., associated with the delivery person) captures one or more subsequence LiDAR scans to generate a subsequent location signature for matching against the shared LiDAR location. On determining a match with the shared LiDAR-based location signature 111, the receiving device alerts the delivery person in the UI 521 to "Deliver here" at the current matching location.

The example use cases above are provided by way of illustration and not as limitations. It is contemplated that the LiDAR-based location signature 115 can be use for any other type of use case including but not to the examples below.

For instance, in the context of ridesharing, a user could "LiDAR scan" a specific pick-up location with her/his phone and provide a corresponding LiDAR-based location signature 111 to an autonomous ride-share vehicle, to enable the vehicle to find the specific pick-up location within a target pick-up area for the user.

For instance, in the context of last mile delivery services, a user could "LiDAR scan" a specific drop-off location, to enable delivery personnel to identify a desired drop-off location for an item being delivered (e.g., as illustrated with respect to FIG. 5C above).

In another example use case, a LiDAR-based location signature 111 can be used to identify a meeting location for an autonomous vehicle or another individual, among others.

In another example use case, a LiDAR-based location signature 111 can be used to help identify or remember location of a parking space. For instance, a user could "LiDAR scan" a desired parking spot and then provide a corresponding LiDAR-based location signature 111 to an autonomous vehicle, so that the vehicle can automatically identify/find and park at the desired parking spot.

In another example use case, a LiDAR-based location signature 111 can be used to indicate location(s) to avoid. For instance, a user could "LiDAR scan" a location of a road hazard so that corresponding LiDAR-based location signature 111 can be shared with vehicle(s)/pedestrian(s) in the area, thereby leading to increased safety during navigation experiences or the like.

In another example use case, the various embodiment the LiDAR location signature process described herein can apply in the context of a single user leveraging LiDAR to "store" a location for future reference (e.g., "remember this location") as a LiDAR-based location signature 111, in addition to or instead of sharing location with another user/device.

Figure 6:
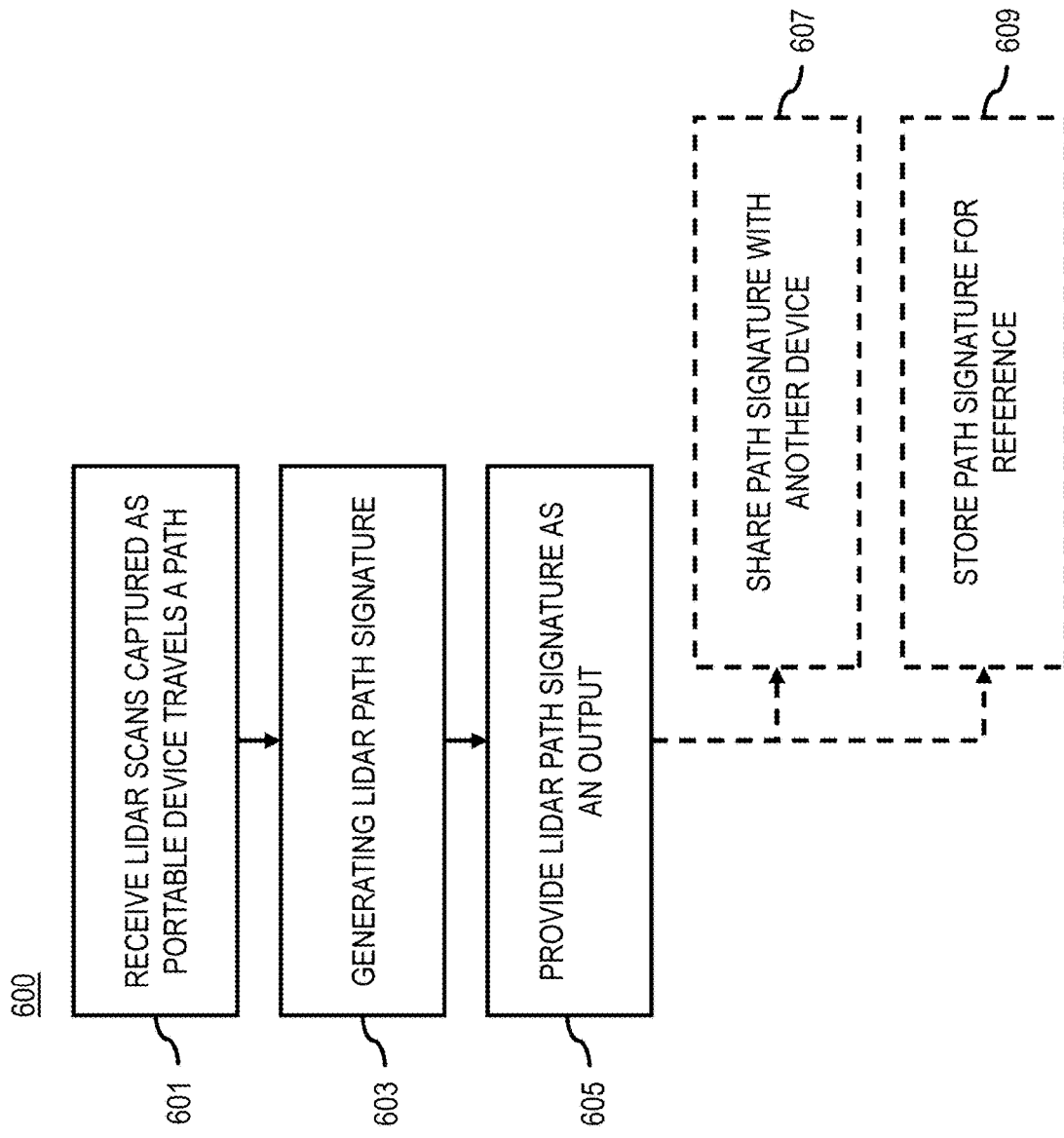
FIG. 6 is a flowchart of a process for creating a LiDAR path signature, according to various example embodiments.

FIG. 6 is a flowchart of a process for creating a LiDAR path signature 115, according to various example embodiments. In various embodiments, the location application 113, location platform 101, and modules 201-205 may perform one or more portions of the process 600 and may be implemented in, for instance, a chip set including a processor and a memory as shown in FIG. 13. As such, the location application 113, location platform 101, and modules 201-205 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In one embodiment, the process 600 extends the various embodiments for creating a LiDAR-based location signature 111 described above to creating a LiDAR path signature 115.

In step 601, the data ingestion module 201 receives a plurality of Light Detection and Ranging (LiDAR) scans 107 captured by a LiDAR sensor 109 of a portable device 103 as the portable device 103 travels on a path through an environment. In other words, a user can collect a continuous LiDAR scan 107 along a path or collect LiDAR scan(s) from time-to-time along the path, to generate a LiDAR path signature 115 representative of the user's path in the environment. As used herein, the term "from time-to-time" refers capturing at least two LiDAR scans 107 at at least two points along the traveled path. The timing of the collection can be opportunistic (e.g., triggered with the data ingestion module 201 detects that the portable device 103 has paused along the path and/or is holding the portable device 103 in position for a LiDAR scan). In other cases, the timing of the collection of each LiDAR scan 107 can be periodic, based on a schedule, conducted on demand, based on a traveled distance, or the like.

Figure 7:
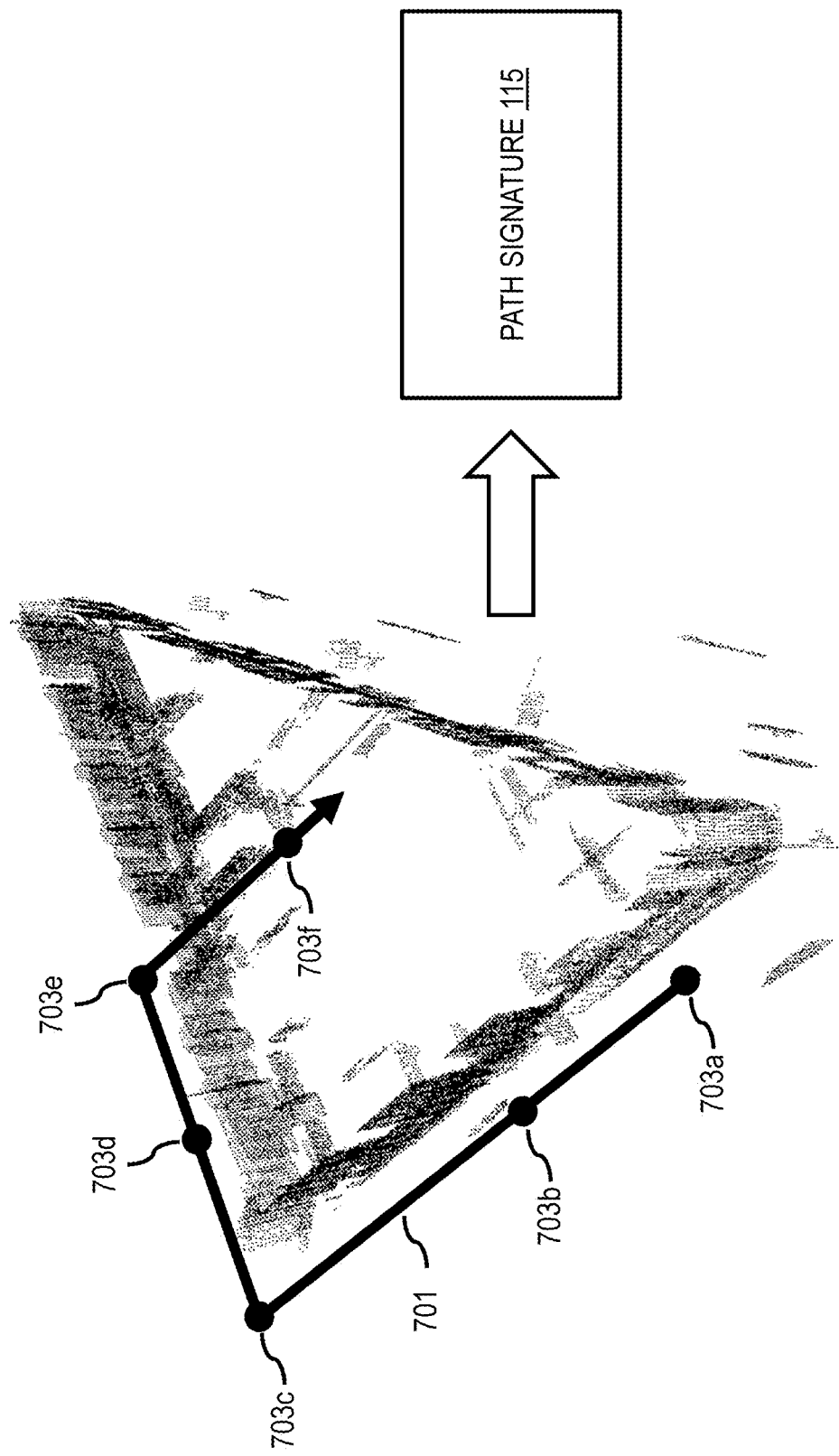
FIG. 7 is a diagram illustrating an example path for creating a corresponding LiDAR path signature, according to various example embodiments.

FIG. 7 is a diagram illustrating an example path 701 for creating a corresponding LiDAR path signature 115, according to various example embodiments. In this example, the path 701 travels from outside of a triangular shaped building to the interior. At data points 703a-703f, a corresponding LiDAR scan 107 is collected according to the various embodiments described herein. Because LiDAR is used, scans captured at the interior data collection point 703f retain the same level of accuracy as scans captures at the outdoor points 703a-703e (e.g., unlike GNSS-based location sensors which would have difficult performing indoors). The LiDAR scans collected at data collections points 703a-703f can then be processed according to the various embodiments described herein to generate a LiDAR path signature 115 to represent the path 701.

In one embodiment, as described with respect to the process 300 of FIG. 3 above, at each data collection point (e.g., data collection points 703a-703f) along the path 701 of the portable device 103, the data ingestion module 201 can generate a user interface that presents a scanning parameter for initiating the capturing of the plurality of LiDAR scans 107. The data ingestion module 201 then presents the user interface on the portable device 103 as the portable device 103 travels on the path 701. As discussed above, the scanning parameter includes a scanning duration, a scanning direction, a scanning orientation, or a combination thereof.

In step 603, the signature module 203 processes the plurality of LiDAR scans 107 to generate a LiDAR path signature 115 that is representative of the path of the portable device 103 through the environment. In one embodiment, the signature module 203 can generate respective LiDAR location signatures 111 for each of the LiDAR scans 107 captured along the travel path of the portable device 103 (e.g., generated according to the various embodiments described with respect to the process 300 of FIG. 3). The signature module 203 can then concatenate or otherwise combine the resulting LiDAR-based location signatures 111 to generate the LiDAR path signature 115. For example, if the LiDAR-based location signature 111 is a point cloud, then the LiDAR path signature 115 is a sequence of point clouds captured along the path. Similarly, if the LiDAR-based location signature 111 is include extracted features, then the LiDAR path signature 115 can be a sequence of extracted feature sets corresponding to each data collection point.

As with the generation of the LiDAR-based location signature 111, in one embodiment, the data ingestion module 201 can initiate capturing of additional sensor data representing an attribute of an environment of the path (e.g., hyperspectral data, manual/automatic tags, etc.). The signature module 201 can associate the additional sensor data, information determined from the additional sensor data, additional tags (e.g., indicating what the signature represents, the reason it is being sent, and/or a request for an action), or a combination thereof with the LiDAR path signature 115.

Figure 8B:
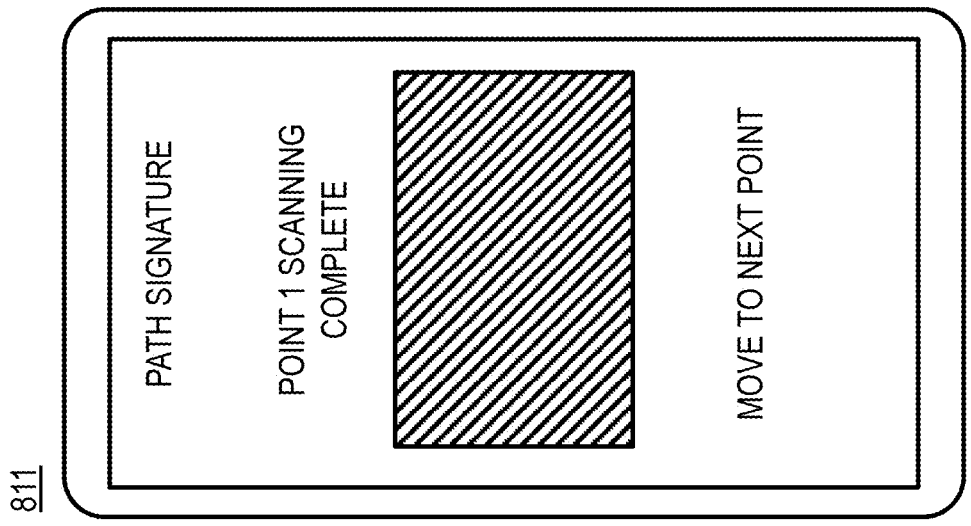
FIGS. 8A and 8B are diagrams illustrating example user interfaces for creating a LiDAR path signature, according to various example embodiments.
Figure 8A:
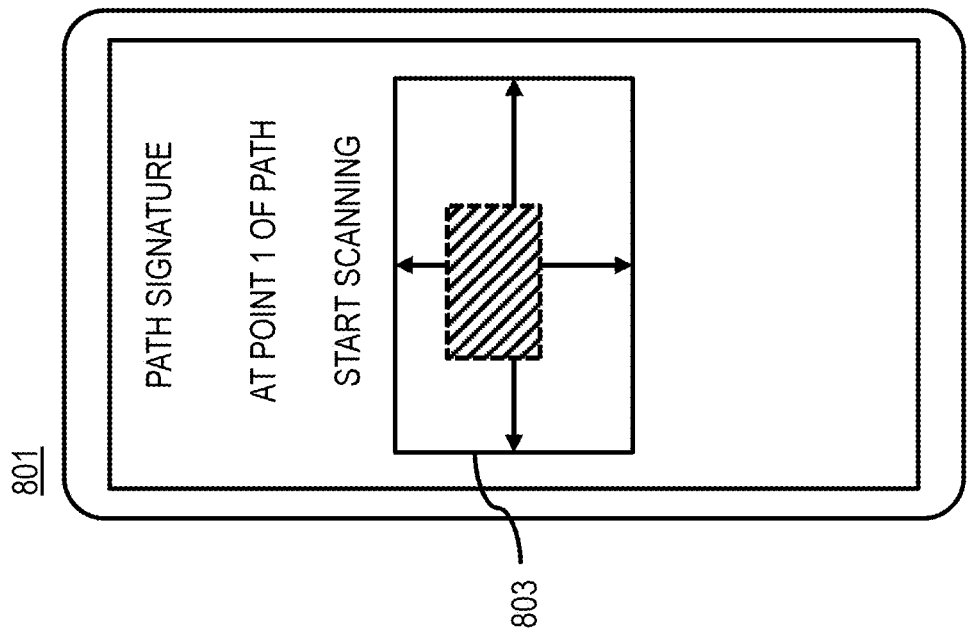

FIGS. 8A and 8B are diagrams illustrating example user interfaces for creating a LiDAR path signature, according to various example embodiments. As shown in FIG. 8A, a UI 801 is displayed for initiating the capture of LiDAR scans 107 to create a LiDAR path signature 115. In this example, the user is at the first data collection of the path, and the UI 801 alerts the user that the user is "At Point 2 of Path" and to "Start Scanning." Similar to the example of FIG. 4A, the UI 801 presents a UI element 803 that indicates the orientation and directions to capture the first LiDAR scan 107 for generating a LiDAR path signature 115. The scanning directions to cover are represented by respective arrows in the UI element 803 and a shaded area in the UI element 403 indicating the area of the environment that has already been scanned. On completion of the LiDAR scan 107, the UI 811 of FIG. 8B alerts the user that "Point 1 Scanning is Complete" and lets the user know the user can "Move to the Next Point" (e.g., next data collection point in the path). This process, for instance, can be repeated until the path is complete or the user indicates that no more scans are needed.

In step 605, the output module 205 provides the LiDAR path signature 115 as an output. It is contemplated that the LiDAR path signature 115 can be output to support any action, function, application, service, etc. that uses or otherwise relies on the LiDAR path signature. Examples of two such use case are illustrated below in optional steps 607 (e.g., path sharing) and 609 (e.g., path storage). It is noted that the examples of steps 607 and 609 are provided by way of illustration and not as limitations.

In optional step 607 for path sharing, the output module 205 transmits the LiDAR path signature 115 to another device 105 to share the path of the portable device 103 creating the LiDAR path signature 115. In one embodiment, the portable device 103, another device 105, or a combination thereof can use the LiDAR path signature as a guide path through the environment. For example, in an example implementation, user A could provide a LiDAR path signature to user B, so as to guide user B along a desired path for a particular purpose. In one embodiment, the portable device 103, another device 105, or a combination thereof captures a plurality of subsequent LiDAR scans of an environment in a given area until a subsequent LiDAR path signature generated from the plurality of subsequent LiDAR scans matches the LiDAR path signature of the first mobile within a threshold matching criterion.

Figure 9:
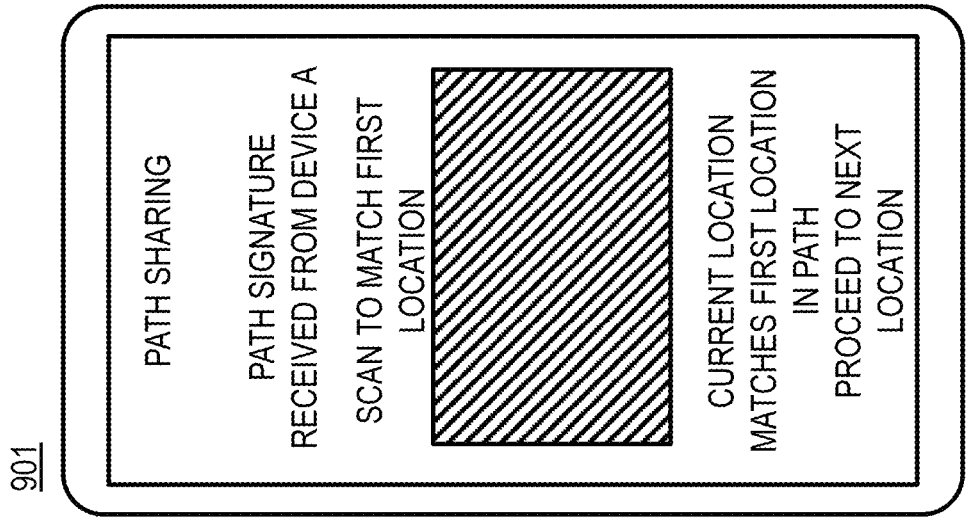
FIG. 9 is a diagram illustrating an example user interface for using a LiDAR path signature for path sharing, according to various example embodiments.

FIG. 9 is a diagram illustrating an example UI 901 for using a LiDAR path signature for path sharing, according to various example embodiments. In this example, a first user has created a LiDAR path signature 103 and has shared it with a second user. Example UI 901 illustrates the process from the second user's perspective. As shown, example UI 901 presenting an alert to the user that a "Path Signature was Received from Device A." The UI 901 also instructs the user to "Scan to March the First Location" (e.g., of the path) so that the user can determine whether the user's current location matches the first location in the received LiDAR path signature 115. In this example, the user initiates LiDAR scan 107 at the user's current location to generate a corresponding LiDAR location signature 111. This LiDAR location signature 111 is matched against the first location signature in the received LiDAR path signature 115. As shown, the user's LiDAR location signature 111 matches and the user is instructed in the UI 901 that "Current Location Matches First Location in Path" and to "Proceed to the Next Location." This process can be repeated until all locations (or a threshold number of locations) in the LiDAR-based location signature 111 is matched.

By way of example, user B could be a delivery person being guided, based on the LiDAR path signature and via subsequent LiDAR scan(s) by user B's device, towards user A's desired drop-off location within a large and perhaps convoluted apartment building. In other words, the guide path (e.g., the shared LiDAR path signature 115) is a delivery path specified by the portable device 103 that created the LiDAR path signature 115.

In optional step 609 for path storage, the output module 205 stores the LiDAR path signature 115 as a reference LiDAR path signature. The LiDAR path signature can be stored locally at the portable device 103 or in the cloud or other component of the system (e.g., to contribute to crowd-sourced path signatures). For example, a user could complete a LiDAR scan of a path, to generate and store a LiDAR path signature for future reference, e.g., so that the user can take the path again in the future or the like.

Figure 10:
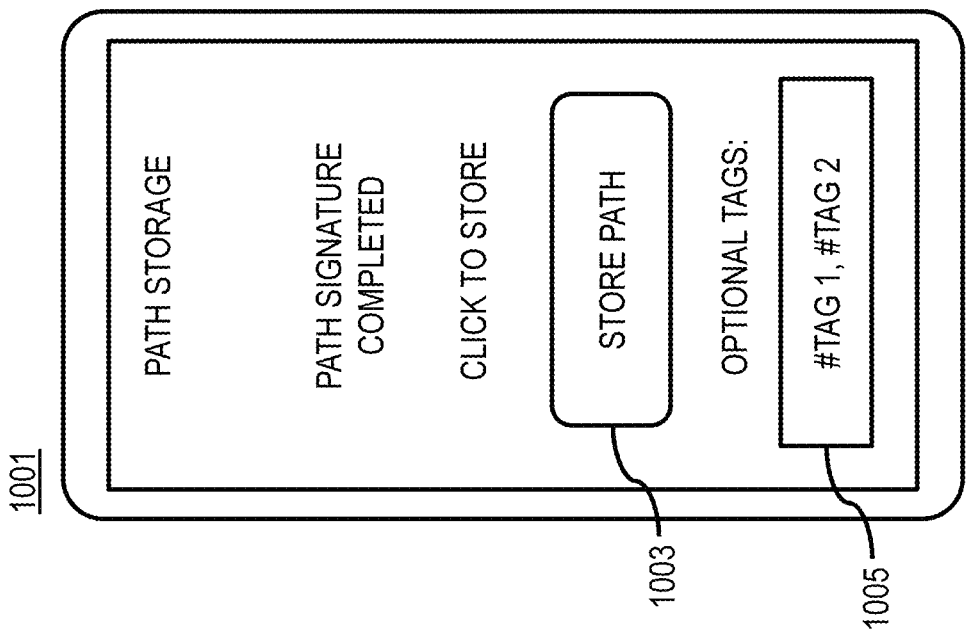
FIG. 10 is a diagram illustrating an example user interface for storing a LiDAR path signature for path sharing, according to various example embodiments.

FIG. 10 is a diagram illustrating an example UI 1001 for storing a LiDAR path signature for path sharing, according to various example embodiments. In the example of FIG. 10, a user has completed the generation of a LiDAR path signature 115 according to the various embodiments described herein. The UI 1001 then provides an option for the store the LiDAR path signature 115 for later reference (e.g., via an interactive UI button 1003 to initiate storage). The UI 1001 also provides a UI element 1005 to specify one or more optional tags for the LiDAR path signature. These tags can be used for any purpose to describe the data including but not limited to: indicating what the signature represents, the reason it is being stored, and/or a request for an action.

In other example use cases, the LiDAR path signature 115 can be used for a variety of tracking use cases that rely on or otherwise use the recorded path or trajectory of a portable device 103.

In one embodiment, it is contemplated that the system 100 can support cloud and/or edge-based features. Examples of cloud-based features include but are not limited to:

Scanning data (e.g., LiDAR scans 107, LiDAR-based location signatures 111, and/or LiDAR path signatures 115) stored on the cloud (e.g., location platform 101, services platform 125, services 127, content providers 129, geographic database 121, etc.), including crowd-sourced data; and Leveraging 5G or better capabilities of the communication network 123 to connect with edge devices.

Examples of edge-based features include but are not limited to:

For live matching of LiDAR-based location signatures 111 and/or LiDAR path signatures 115 with reference signatures/footprints; and Extracting the relevant features from the LiDAR scans 107 to transmit to the cloud for efficiency.

Returning to FIG. 1, as shown, the system 100 includes a location application 113 and/or location platform 101 for creating LiDAR-based location signatures 111 and/or LiDAR path signatures 115. In one embodiment, the location application 113 and/or location platform 101 have connectivity over the communication network 123 to each other, the services platform 125 that provides one or more services 127 that can use the LiDAR-based location signatures 111 and/or LiDAR path signatures 115 to perform one or more functions, or to provide data for generating the signatures. By way of example, the services 127 may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 127 uses the output of the location application 113 and/or location platform 101 (e.g., LiDAR-based location signatures 111 and/or LiDAR path signatures 115) to provide functions such as navigation, mapping, other location-based services, etc. to the portable device 103, devices 105, and/or other components of the system 100.

In one embodiment, the location application 113 and/or location platform 101 may be a platform with multiple interconnected components. The location application 113 and/or location platform 101 may have access to or otherwise include multiple servers, intelligent networking devices, computing devices, components, and corresponding software for combining location data sources according to the various embodiments described herein. In addition, it is noted that the location application 113 and/or location platform 101 may be a separate entity of the system 100; a part of one or more services 127, a part of the services platform 125; or included within components of the portable device 103 and/or device 105.

In one embodiment, content providers 129 may provide content or data (e.g., including network feature data, graph data, geographic data, etc.) to the geographic database 121, the location application 113, the location platform 101, the services platform 125, the services 127, and/or the portable device 103. The content provided may be any type of content, such as reference location/path signatures, map content, textual content, audio content, video content, image content, etc. In one embodiment, the content providers 129 may also store content associated with the geographic database 121, location application 113 and/or location platform 101, services platform 125, services 127, and/or any other component of the system 100. In another embodiment, the content providers 129 may manage access to a central repository of data, and offer a consistent, standard interface to data, such as a repository of the geographic database 121.

In one embodiment, the portable device 103 may execute location applications 113 to use or generate LiDAR-based location signatures 111 and/or LiDAR path signatures 115 according to the embodiments described herein. By way of example, the location applications 113 may also be any type of application that is executable on the portable device 103 and/or device 105, such as, but not limited to, routing applications, mapping applications, location-based service applications, navigation applications, device control applications, content provisioning services, camera/imaging application, media player applications, social networking applications, calendar applications, and the like. In one embodiment, the location applications 113 may act as a client for the location platform 101 and perform one or more functions associated with generating or using LiDAR-based location signatures 111 and/or LiDAR path signatures 115 alone or in combination with the location platform 101.

By way of example, the portable device 103 and/or device 105 is or can include any type of embedded system, mobile terminal, fixed terminal, or portable terminal including a mobile device, augmented reality device, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the portable device 103 and/or device 105 can support any type of interface to the user (such as "wearable" circuitry, etc.). In one embodiment, the portable device 103 and/or device 105 may be associated with or be a component of any other device.

In one embodiment, the portable device 103 and/or device 105 are configured with various sensors for generating or collecting depth sensing data (e.g., LiDAR scans 107) and related geographic data. By way of example, the sensors may include a LiDAR sensor 109, any other depth sensing sensor, global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, and the like.

Other examples of sensors of the portable device 103 and/or device 105 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the portable device 103 and/or device 105 may detect the relative distance of the device other features in the environment including but not limited to buildings, objects, terrain, etc. In one scenario, the sensors may detect weather data, traffic information, or a combination thereof. In one embodiment, the portable device 103 and/or device 105 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the location application 113, location platform 101, services platform 125, services 127, portable device 103, device 105, and/or content providers 129 communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
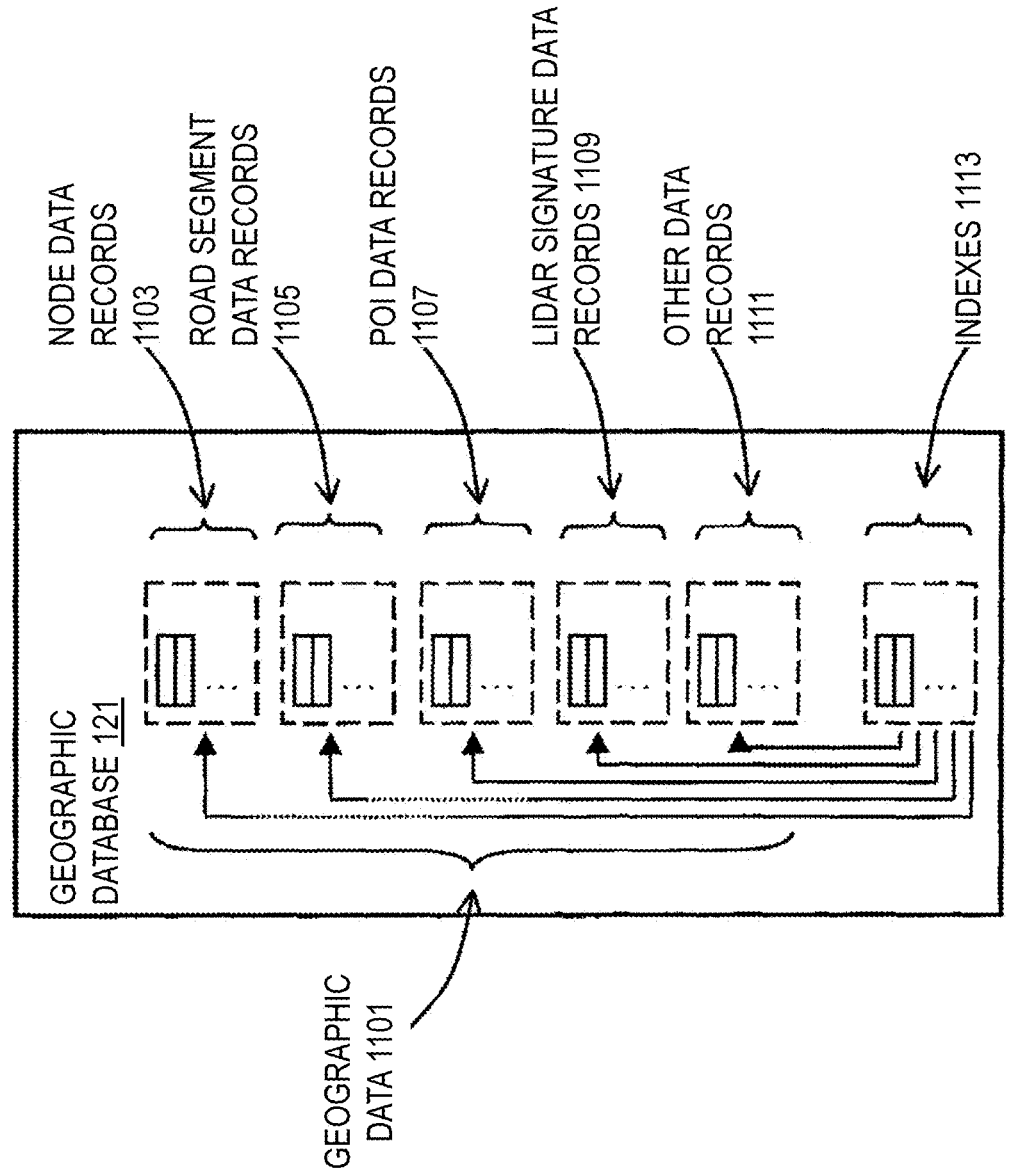
FIG. 11 is a diagram of geographic database, according to various example embodiments.

FIG. 11 is a diagram of the geographic database 121 of system 100, according to exemplary embodiments. In the exemplary embodiments, modal routes, trajectories (sequences of probe points), road segments, lane model information and/or other related information can be stored, associated with, and/or linked to the geographic database 121 or data thereof. In one embodiment, the geographic database 121 includes geographic data 1101 used for (or configured to be compiled to be used for) mapping and/or navigation-related services, such as for personalized route determination, according to exemplary embodiments. For example, the geographic database 121 includes node data records 1103, road segment or link data records 1105, POI data records 1107, LIDAR signature data records 1109, and other data records 1111. More, fewer, or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques).

In exemplary embodiments, the road segment data records 1105 are links or segments representing roads, streets, or paths, as can be used in the calculated route or recorded route information for determination of one or more personalized routes, according to exemplary embodiments. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 1107. The geographic database 121 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In addition, the geographic database 121 can include LiDAR signature data records 1109 for reference signatures/footprints, LiDAR location signatures 111, LiDAR path signatures 115, and/or any other related data used in the embodiments of LiDAR signature generation according to the various embodiments described herein.

The geographic database 121 can be maintained by the content provider 129 in association with the services platform 125 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database 121 or data in the master geographic database 121 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 105. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 121 can be a master geographic database, but in alternate embodiments, the geographic database 121 can represent a compiled navigation database that can be used in or with end user devices (e.g., portable device 103, device 105 etc.) to provide navigation-related functions or other localization (e.g., location sharing via LiDAR-based location signatures 111 and/or LiDAR path signatures 115). For example, the geographic database 121 can be used with the end user device to provide an end user with navigation features. In such a case, the geographic database 121 can be downloaded or stored on the end user device (e.g., portable device 103, device 105, etc.), or the end user device can access the geographic database 121 through a wireless or wired connection (such as via a server and/or the communication network 123), for example.

The processes described herein for generating LiDAR-based location signatures 111 and/or LiDAR path signatures 115 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
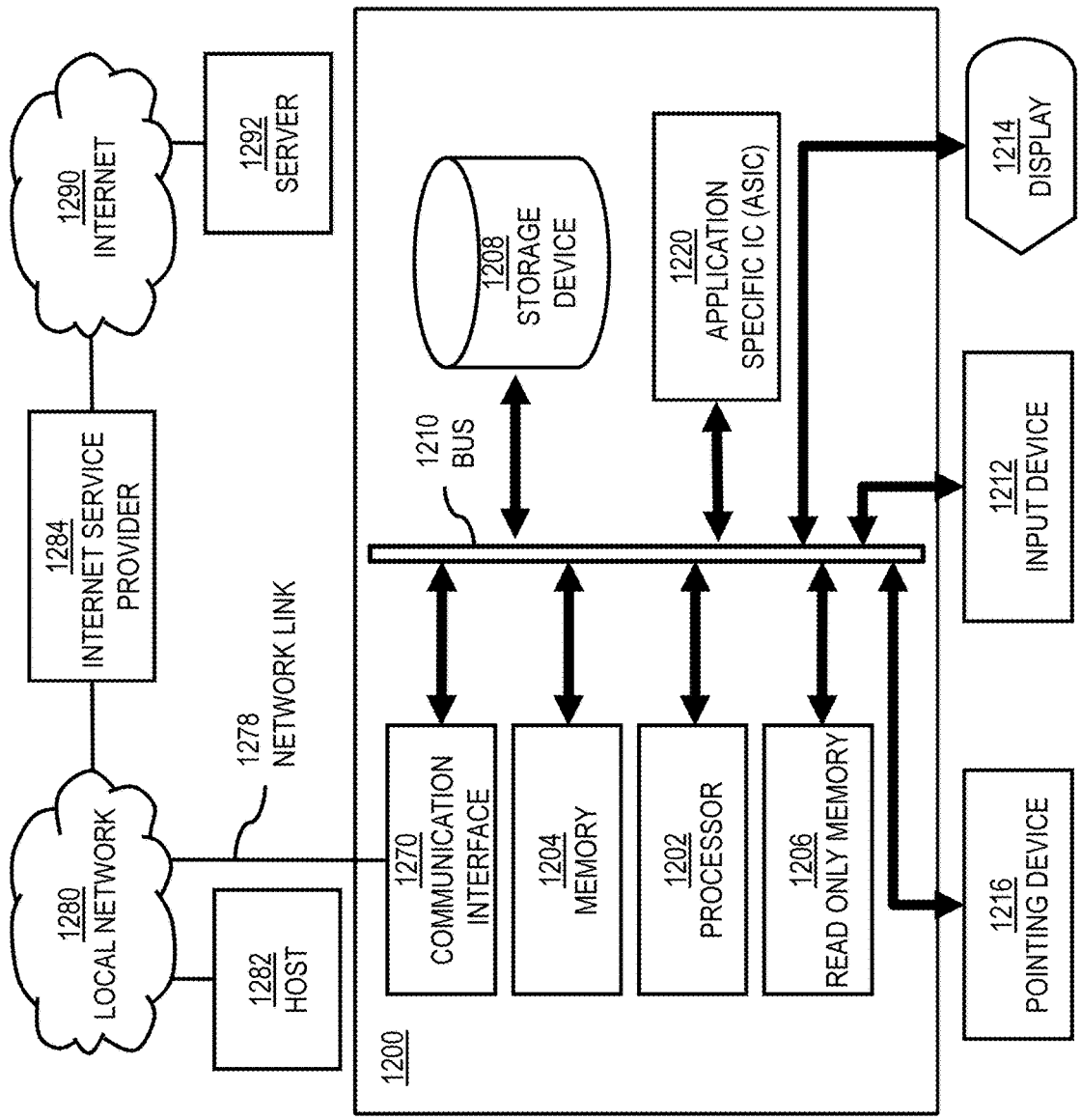
FIG. 12 is a diagram of hardware that can be used to implement various example embodiments.

FIG. 12 illustrates a computer system 1200 upon which an embodiment of the invention may be implemented. Computer system 1200 is programmed (e.g., via computer program code or instructions) to generate LiDAR-based location signatures 111 and/or LiDAR path signatures 115 as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to generating LiDAR-based location signatures 111 and/or LiDAR path signatures 115. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for generating LiDAR-based location signatures 111 and/or LiDAR path signatures 115. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for generating LiDAR-based location signatures 111 and/or LiDAR path signatures 115, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 123 for generating LiDAR-based location signatures 111 and/or LiDAR path signatures 115.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system can be deployed in various configurations within other computer systems, e.g., host 1282 and server 1292.

FIG. 13 illustrates a chip set 1300 upon which an embodiment of the invention may be implemented. Chip set 1300 is programmed to generate LiDAR-based location signatures 111 and/or LiDAR path signatures 115 as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to generate LiDAR-based location signatures 111 and/or LiDAR path signatures 115. The memory 1305 also stores the data associated with or generated by the execution of the inventive steps.

Figure 14:
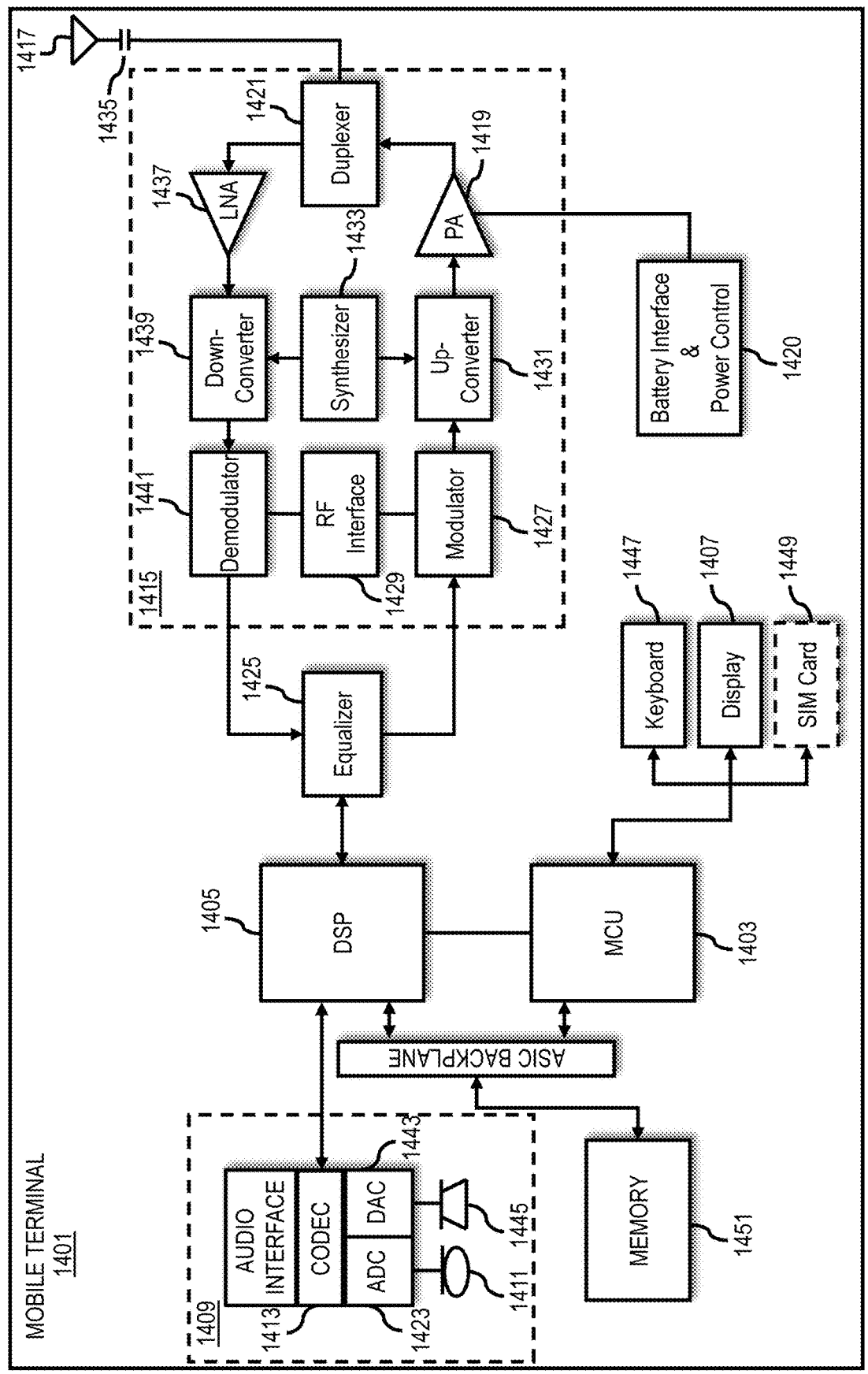
FIG. 14 is a diagram of a mobile terminal that can be used to implement various example embodiments.

FIG. 14 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to generate LiDAR-based location signatures 111 and/or LiDAR path signatures 115. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
receiving, by one or more processors, a Light Detection and Ranging (LiDAR) scan of a location captured by a LiDAR sensor of a portable device;
processing the LiDAR scan to generate a LiDAR location signature that is representative of the location of the portable device, wherein the LiDAR scan is a point cloud and the LiDAR location signature includes a feature extracted from the point cloud, a subsampling of the point cloud, a crop of the point cloud, or a combination thereof; and
transmitting the LiDAR location signature to another device to share the location of the portable device with the another device.

2. The method of claim 1, wherein the another device compares the LiDAR location signature to a reference LiDAR location signature to determine the shared location of the portable device.

3. The method of claim 2, wherein the reference LiDAR location signature is generated by crowdsourcing, a cloud device, an edge device, the another device, or a combination thereof.

4. The method of claim 1, wherein the another device captures a subsequent LiDAR scan of an environment in a given area until a subsequent LiDAR location signature generated from the subsequent LiDAR scan matches the LiDAR location signature of the portable device within a threshold matching criterion.

5. The method of claim 1, further comprising:
generating a user interface that presents a scanning parameter for initiating the capturing of the LiDAR scan; and
presenting the user interface on the portable device.

6. The method of claim 5, wherein the scanning parameter includes a scanning duration, a scanning direction, a scanning orientation, or a combination thereof.

7. The method of claim 1, further comprising:
capturing additional sensor data representing an attribute of an environment of the location; and
associating the additional sensor data, information determined from the additional sensor data, or a combination thereof with the LiDAR location signature.

8. The method of claim 7, wherein the additional sensor data includes hyperspectral data, and wherein the method further comprises:
processing the hyperspectral data to determine information about a material of an object located in the environment of the location.

9. The method of claim 1, wherein the LiDAR location signature is used to indicate a meeting location, a delivery location, a parking location, a location that is to be avoided, or a combination thereof.

10. The method of claim 1, wherein the LiDAR location signature includes a point cloud representing at least a portion of the environment of the location.

11. An apparatus comprising:
at least one processor; and
at least one memory including computer program code for one or more programs,
the at least one memory and the computer program code configured to, within the at least one processor, cause the apparatus to perform at least the following,
receiving, by one or more processors, a Light Detection and Ranging (LiDAR) scan of a location captured by a LiDAR sensor of a portable device;
processing the LiDAR scan to generate a LiDAR location signature that is representative of the location of the portable device, wherein the LiDAR scan is a point cloud and the LiDAR location signature includes a feature extracted from the point cloud, a subsampling of the point cloud, a crop of the point cloud, or a combination thereof; and
transmitting the LiDAR location signature to another device to share the location of the portable device with the another device.

12. The apparatus of claim 11, wherein the another device compares the LiDAR location signature to a reference LiDAR location signature to determine the shared location of the portable device.

13. The apparatus of claim 12, wherein the reference LiDAR location signature is generated by crowdsourcing, a cloud device, an edge device, the another device, or a combination thereof.

14. The apparatus of claim 11, wherein the another device captures a subsequent LiDAR scan of an environment in a given area until a subsequent LiDAR location signature generated from the subsequent LiDAR scan matches the LiDAR location signature of the portable device within a threshold matching criterion.

15. The apparatus of claim 11, further comprising:
generating a user interface that presents a scanning parameter for initiating the capturing of the LiDAR scan; and
presenting the user interface on the portable device.

16. A non-transitory computer-readable storage medium carrying one or more sequences of one or more instructions which, when executed by one or more processors, cause an apparatus to perform:
receiving, by one or more processors, a Light Detection and Ranging (LiDAR) scan of a location captured by a LiDAR sensor of a portable device;
processing the LiDAR scan to generate a LiDAR location signature that is representative of the location of the portable device, wherein the LiDAR scan is a point cloud and the LiDAR location signature includes a feature extracted from the point cloud, a subsampling of the point cloud, a crop of the point cloud, or a combination thereof; and
transmitting the LiDAR location signature to another device to share the location of the portable device with the another device.

17. The non-transitory computer-readable storage medium of claim 16, wherein the another device compares the LiDAR location signature to a reference LiDAR location signature to determine the shared location of the portable device.

18. The non-transitory computer-readable storage medium of claim 17, wherein the reference LiDAR location signature is generated by crowdsourcing, a cloud device, an edge device, the another device, or a combination thereof.

19. The non-transitory computer-readable storage medium of claim 16, wherein the another device captures a subsequent LiDAR scan of an environment in a given area until a subsequent LiDAR location signature generated from the subsequent LiDAR scan matches the LiDAR location signature of the portable device within a threshold matching criterion.

20. The non-transitory computer-readable storage medium of claim 16, further comprising:
- generating a user interface that presents a scanning parameter for initiating the capturing of the LiDAR scan; and
- presenting the user interface on the portable device.

* * * * *